Feb. 2, 1954 — B. T. BOWEN — 2,667,795
COUNTERBORE ATTACHMENT
Filed Feb. 7, 1948
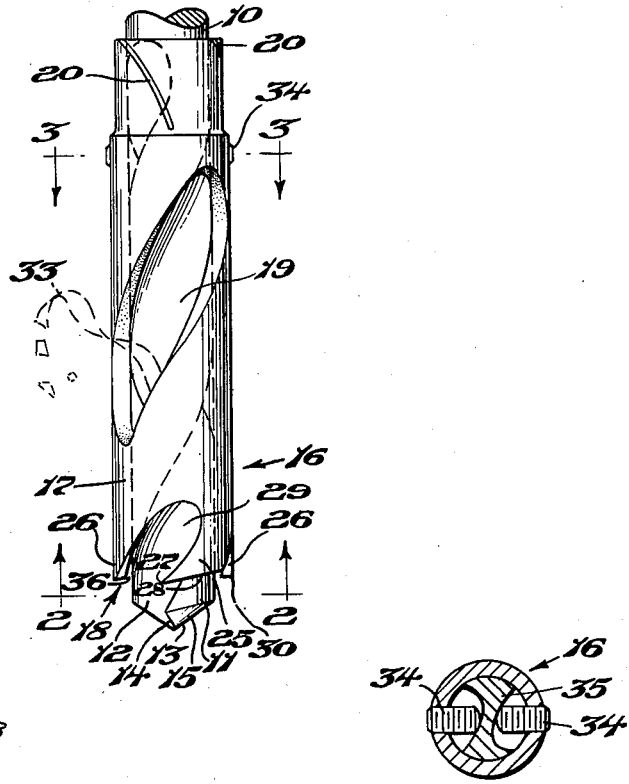
Fig. 1.
Fig. 2.
Fig. 3.
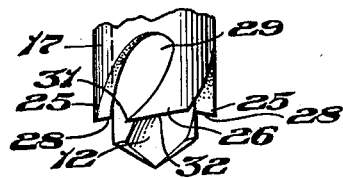
Fig. 4.
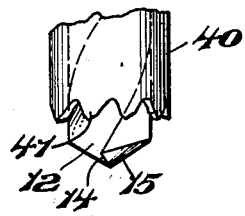
Fig. 5.
Inventor
Bradford T. Bowen
By Barlow & Barlow
Attorneys Patented Feb. 2, 1954

2,667,795

UNITED STATES PATENT OFFICE 2,667,795

COUNTERBORE ATTACHMENT

Bradford T. Bowen, Rumford, R. I., assignor of one-half to Robert F. Walker, Providence, R. I.

Application February 7, 1948, Serial No. 6,833

10 Claims. (Cl. 77—65)

This invention relates to an attachment for drills to provide a counterbore or a countersink.

It is quite usual in the formation of holes where there must be some counterbore made, to first drill the hole required, then remove the drill, and then to counterbore as desired in another operation. In some cases, there may be provided an arrangement so that the counterboring may be done in the same operation, but in such cases, the depth of the counterbore which may be made is very materially limited, and other limitations occur which are undesirable.

One of the objects of this invention is to provide a counterboring attachment for a drill which may be placed upon the drill and gripped in the same jaws that would grip the drill or the drill driving device.

Another object of this invention is to provide an arrangement so that the chips which are formed by the counterbore may be taken out through the clearance grooves formed in the drill, and thus provide an arrangement so that the counterbore may extend unlimited distances into the work and still have proper clearance.

Another object of this invention is to provide a counterbore with clearance openings provided rearwardly from its forward cutting edge so that these may be aligned with the clearance grooves of the drill for the escape of the chips from the assembly of drill and counterbore.

Another object of this invention is to provide an arrangement so that there will be a good gripping action between the jaws which grip the assembly and the counterbore and drill, with an arrangement so that the jaws will span across the slots which provide for the resilient end of the counterbore.

With these and other objects in view, the invention consists of certain novel features of construction as will be more fully described and particularly pointed out in the appended claims.

In the accompanying drawings:

Figure 1 is an elevation illustrating the counterbore as assembled upon a drill and illustrating in dotted lines the escaping chips from the action of the drill and counterbore in the work;

Figure 2 is a section on line 2—2 of Figure 1:

Figure 3 is a section on line 3—3 of Figure 1 showing the means for binding the counterbore on the drill;

Figure 4 is a view similar to Figure 1 of a lower fragment thereof and at right angles to the showing in Figure 1; and Figure 5 is a fragmentary view similar to Figure 1 of a modified form.

With reference to the drawings, 10 designates the shank of the drill which is provided with an outer cylindrical surface 11 and a pair of grooves 12 which are disposed helically about the drill for the clearance of chips. The drill end is sharpened or tapered as at 13 so as to provide a cutting edge 14 with a clearance 15 extending therefrom to the following groove on the opposite side of the drill.

The counterboring attachment is designated 16 and consists of a cylindrical tubular body designated generally 17 which is provided with a cutting edge designated generally 18. Slot 19 is disposed somewhat along the form of a helix, as shown in Figure 1 which will conform to the shape of the slot 12 in the drill which the counterboring attachment is to receive so as to align therewith. While the upper end of the body 17 is provided with a plurality of slots 20 disposed somewhat helically, although of opposite pitch to cross the groove 12, so that when a chuck grips this portion of the attachment, it will span the slots and contract the tube tightly about the drill and bind both the attachment and the drill in the chuck.

The cutter at the lower extremity of the counterboring device is shaped in the form of a plurality of teeth 25 and 26. The teeth 25 are each provided with a cutting edge 27 which is inclined from its leading outer peripheral edge backwardly as it extends inwardly, as shown in Figures 2 and 4. Also, this tooth is provided with a clearance 28 which recedes from the edge 27. The space between the teeth is designated generally 29 and is helical on the pitch of the groove 12. The alternate teeth 26, as shown more clearly in Figures 1 and 2, are of a thickness less than the thickness of the teeth 25, although their outer surface 30 is in the same circular radius as the teeth 25. These teeth each have a cutting edge as at 31 and a clearance 32. The purpose of their being of a different thickness is so that chips which are formed by the edge 31 of the tooth 26 may pass by the tooth 26 into the groove 12 of the drill, and these chips, as illustrated in dotted lines at 33, may pass upwardly through the groove 12 and emerge through the slot 19 of the counterboring attachment.

In order that the counterboring attachment will not rotate with reference to the drill upon which it is assembled, and be properly aligned, and so that the opening 19 and the teeth may be properly disposed with reference to the drill, studs 34 are threaded through the attachment adjacent its upper end, as more clearly shown in Fig. 3, so as to enter the groove 12 and engage the body of the drill, as shown at 35.

The chips which are formed by the edge 27 are pushed ahead of the edge 27 which, being inclined inwardly, directs these chips into the groove 12 of the drill. However, in the case of the teeth 26, the cutting edge 31 would have no place to force the chips ahead of it into any clearance space, and, therefore, these teeth 26 are formed narrower to leave a clearance 36, so that these smaller chips may pass between the inner edge of the cutting edge 30 and also into the groove 12, and, in this way, both sets of teeth are cleared of the chips which they provide.

In order that this function may be performed, it is necessary that the countersink be properly aligned with the drill, and for this purpose, I cause the cutting edge 27 of the counterbore to be substantially in line with a continuation of the edge of the groove 12 of the teeth 27; whereas, for equal spacing purposes, the cutting edge of the teeth 26 is also substantially in line with the opposite edge of the groove 12, as shown in Figure 2. This also provides that the helical slots 19 and 29 will be aligned.

In Figure 5 the counterbore 40 is provided at its lower edge with saw teeth 41 which have their edges so beveled that where these teeth are along the grooves 12 they will discharge chips into the groove 12. The other teeth are of a reduced radial dimension so that chips formed thereby will pass inwardly of the teeth to one of the grooves in the drill as above explained for the teeth 26.

The body 17 of the counterbore is back tapered so as to provide clearance as the same enters the work.

I claim:

1. A counterboring attachment for drills comprising a tubular body, the bore of which is of a size to receive a drill therethrough, means to secure the body to the drill, one end of the body being cylindrical and having its extremity formed to provide a cutter with a plurality of teeth formed by spaces extending inwardly from the end of the cutter throughout the lateral thickness of the wall of the body and terminating a short axial distance from the end of the cutter with the surfaces of said teeth formed by the edges of said spaces shaped to direct the removed material inwardly toward its axis and within the tubular body and along the groove of the drill.

2. A counterboring attachment as in claim 1 wherein alternate teeth are of different thicknesses.

3. A counterboring attachment as in claim 1 wherein some teeth are of the thickness of said body and teeth alternating therewith are of a thickness less than the thickness of the body.

4. A counterboring attachment as in claim 1 wherein some teeth are of the thickness of said body and teeth alternating therewith are of a thickness less than the thickness of the body, with all of the teeth having their outer surface in the same radial circle.

5. In combination a drill having helical grooves therein, a counterboring attachment embracing the drill and fixed thereto, comprising a body having an opening therethrough registering with one of said grooves with a cutting end formed with a tooth at the edge of said opening having its leading edge located at substantially the edge of the groove and inclined to direct the chip formed thereby inwardly into the groove ahead of it.

6. In combination a drill having helical grooves therein, a counterboring attachment embracing the drill and fixed thereto, comprising a body having openings therethrough registering with said grooves with a cutting end formed with a plurality of teeth at the edges of said openings with their leading edges located at substantially the edges of the grooves and inclined to direct the chips formed thereby inwardly into the groove ahead of it.

7. In combination a drill having helical grooves therein, a counterboring attachment embracing the drill and fixed thereto, comprising a body having an opening therethrough registering with one of said grooves with a cutting end formed with a tooth at the edge of said opening having its leading edge located at substantially the edge of the groove and inclined to direct the chip formed thereby inwardly into the groove ahead of it, said body having a slot also aligned with one of said helical grooves through which the chips may emerge.

8. In combination a drill having helical grooves therein, a counterboring attachment embracing the drill and fixed thereto, comprising a body having openings therethrough registering with said grooves with a cutting end formed with a plurality of teeth at the edges of said openings with their leading edges located at substantially the edge of the groove and inclined to direct the chips formed thereby inwardly into the groove ahead of it, said body having slots also aligned with said helical grooves through which the chips may emerge.

9. The combination as in claim 8 where said teeth are main teeth and additional teeth of a lesser thickness are interposed between said main teeth.

10. The combination as in claim 8 where said teeth are main teeth and additional teeth of a lesser thickness are interposed between said main teeth, said body having slots also aligned with said helical grooves through which the chips may emerge.

BRADFORD T. BOWEN.

References Cited in the file of this patent

UNITED STATES PATENTS

| Number | Name | Date |
| --- | --- | --- |
| 162,315 | Shaw et al. | Apr. 20, 1875 |
| 302,292 | Soderstrom | July 22, 1884 |
| 303,053 | Russell | Aug. 5, 1884 |
| 332,308 | Valentine | Dec. 15, 1885 |
| 418,903 | Weiss | Jan. 7, 1890 |
| 421,218 | Wood | Feb. 11, 1890 |
| 476,312 | Resche | June 7, 1892 |
| 532,472 | Minnich | Jan. 15, 1895 |
| 800,894 | Baldwin | Oct. 3, 1905 |
| 1,111,410 | Semon | Sept. 22, 1914 |

FOREIGN PATENTS

| Number | Country | Date |
| --- | --- | --- |
| 38,188 | Germany | Jan. 14, 1887 |
| 875,441 | France | June 22, 1942 |
| 17,756 | Great Britain | Aug. 4, 1911 |
| 172,828 | Great Britain | Dec. 22, 1921 |
| 207,440 | Great Britain | Nov. 29, 1923 |